Sept. 24, 1963 W. A. HOSIER ETAL 3,105,143

SELECTIVE COMPARISON APPARATUS FOR A DIGITAL COMPUTER

Filed June 30, 1959 3 Sheets-Sheet 1

INVENTORS
HARRY S. HOFFMAN JR.
WILLIAM A. HOSIER

BY

Edgar H. Kent

ATTORNEY

United States Patent Office 3,105,143
Patented Sept. 24, 1963

3,105,143
SELECTIVE COMPARISON APPARATUS FOR A DIGITAL COMPUTER

William A. Hosier, Stoneham, Mass., and Harry S. Hoffman, Jr., Saugerties, N.Y., assignors, by direct and mesne assignments, to Research Corporation, New York, N.Y., a corporation of New York Filed June 30, 1959, Ser. No. 823,885
9 Claims. (Cl. 235—157)

This invention relates to electronic data processing ma- :hines of the digital, stored program type and more par- icularly to apparatus for enabling a comparison of entire lata words or selected portions thereof suitable for utiliza- ion in such data processing equipment.

In conventional data processing operations it is fre- [uently necessary to compare a large number of data tems as for example in table look-up operations and in earch operations. Generally, the available comparison .pparatus enables only a determination as to whether an xact one-to-one correspondence between every bit in the wo words being compared exists. Further in the conven- ional comparing operation it is necessary to utilize at ɜast four instructions for the comparison of each piece ıf data. A first data word is stored in a preliminary oper- tion. Typical instructions for a data search in a se- uential table are: (1) an Extract instruction for select- ıg the second data word on which a comparison is to be erformed and placing that word in a suitable register, 2) a Subtract instruction for subtracting the words to e compared and providing a difference, (3) a Branch on 'ull zero instruction for examining the difference and ranching the computer program to the next desired peration instruction if in fact, a one-to-one comparison difference is zero) had been made, and (4) a Branch in- :ruction for returning the program to the Extract in- :ruction for repeating the comparison in those cases 'here no comparison was achieved. In table look-up perations and other computing operations which require ata analysis and computer decisions based on small por- ons of the entire stored data many such Compare oper- :ions must be repeatedly performed and any saving in ıe number of instructions or increase in the speed of :complishing this operation results in substantial econ- mies in the over-all system operation.

Accordingly, it is an object of the invention to provide ı improved apparatus for more expeditiously perform- ıg data comparison operations in digital data processing achines.

Another object of the invention is to provide apparatus ıpable of rapidly performing compare operations on ıta words in digital data processing equipments in a :xible manner in suitable coordination with the com- ıter program.

Still another object of the invention is to provide appa- .tus for flexibly performing compare operations on com- ete data words, portions of data words and nonadjacent t locations in data words in an optional manner.

Still another object of the invention is to provide ›paratus capable of performing both static and dynamic ımparisons in data processing equipments and which nploys many of the generally available circuitries there- .

A further object of the invention is to provide appara- s which enables improved control of the programming ›eration of the associated data processing machine and ırticularly provides expeditious handling of table look- › and similar repetitious operations.

The apparatus, according to principles of the invention, a digital computer adapted to process data in the paral- [ mode utilizes a conventional Accumulator in which one data word to be compared is placed and a conventional A Register in which the second data word is placed, the latter being selected and withdrawn from memory in response to the Compare instruction. Other logical circuitries, including an Adder circuit, are utilized to enable the performance of both static and dynamic comparisons in response to specified information associated with the Compare instruction word. In the static comparison mode neither data word is destroyed while in the dynamic comparison mode a subtraction is performed. Associated circuitry is provided so that the subsequent program operation of the computer may be controlled in response to the resultant comparison or difference. Means for providing masking information incorporated in the apparatus enable comparison operations to be performed on pre-selected portions of the data words only, including nonadjacent bit locations. Each comparison is performed in response to a single instruction word in a rapid and expeditious manner that reduces the computer time required for each comparison operation by at least a factor of two.

Other objects and advantages of the invention will be seen as the following description of the preferred embodiment progresses in conjunction with the drawings, in which.

Figures 1, 3:
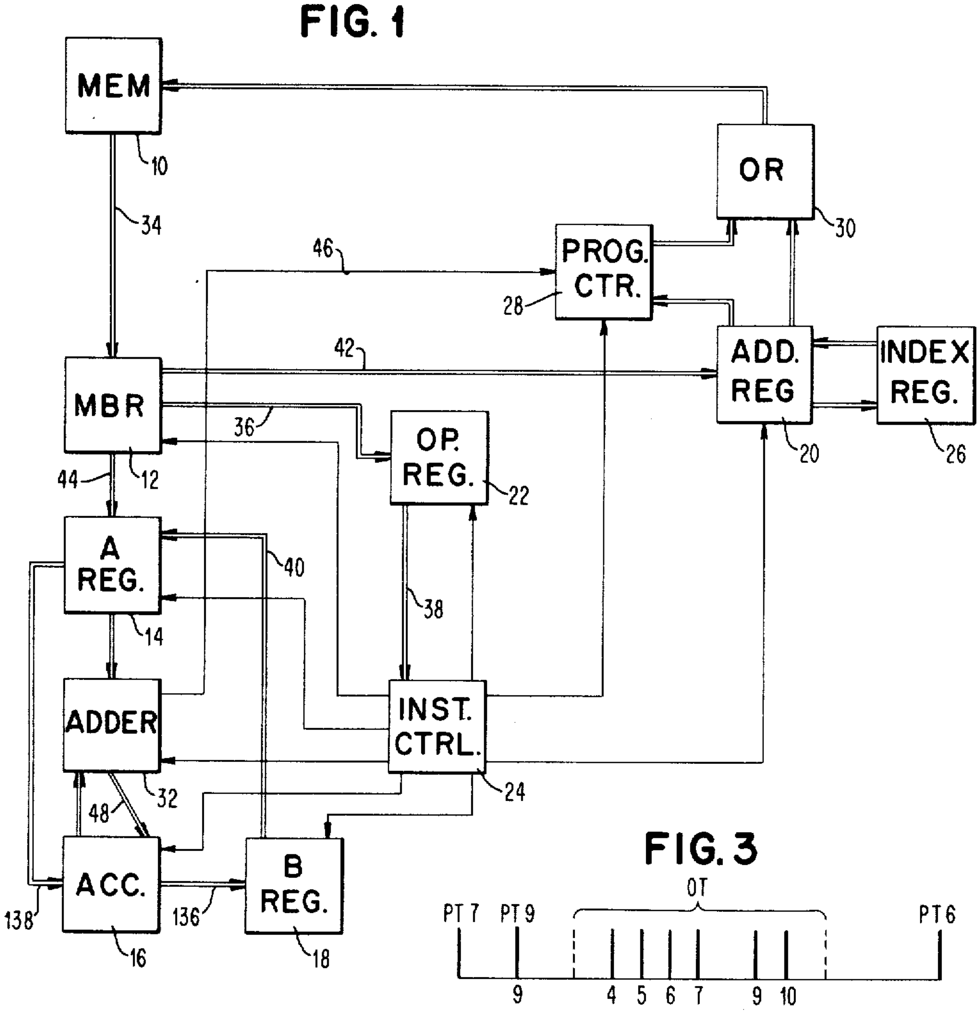
FIG. 1 is a block diagram of the computer circuitry utilized in practicing the preferred embodiment of the invention.
FIG. 3 is a diagram illustrating the timing relationship of the machine operation cycle in accordance with the preferred embodiment of the invention.

Throughout the following description and in the accompanying drawings there are certain conventions employed which are familiar to certain of those skilled in the art. Additonal information concerning those conventions is as follows:

In the Block Diagram figures of the drawing a conventional filled-in arrowhead is employed on lines throughout the drawing to indicate (1) a circuit connection (2) energization with a pulse and (3) the direction of pulse travel which is also the direction of control. A diamond-shaped arrowhead indicates (1) a circuit connection and (2) energization with a D.C. level. Cables which are used to transfer data are shown as two parallel lines with the arrowheads at one end thereof and lines which are used to transfer control signals are indicated as a single line with an arrowhead indicative of the direction of transfer at one end thereof.

Bold face character symbols appearing within a block symbol identify the common name for the circuit represented, that is, FF identifies a flip-flop, G a gate circuit, A a logical AND circuit, OR a logical OR circuit, and so forth. A variety of circuits for the performance of each of these functions is known in the art. Suitable circuits are shown and described in the copending application Serial No. 570,199 now Patent No. 2,914,248 entitled, Electronic Data Processing Machine, filed in the name of Harold D. Ross et al. on March 7, 1956.

The preferred embodiment of the invention is utilized in a computer which operates along similar principles to the machine described in detail in Patent No. 2,914,-248. Pertinent portions of the computer there described are shown in block form in FIG. 1. This machine includes a Memory 10 and a Memory Buffer Register 12 through which data stored in Memory is transferred. As the subject matter of this invention is concerned primarily with transfers from the Memory, details of placing information into memory are not shown herein and reference may be had to the aforementioned Docket for additional information if desired. Data from the Memory Buffer Register 12 may be transferred to the A Register 14 and through that register to the Accumulator 16 and the B Register 18. Additionally, data may be transferred from Memory through the Memory Buffer Register to the Address Register 20. Additional information which includes the operation portion of the instruction word is transferred from the Memory Buffer Register through the Operations Register 22 to the Instruction Control element 24. Operation of the computer is under the general control of the Instruction Control element and hence a number of control signal lines emanate therefrom. Associated with the Address Register is an Index Register 26 which enables the indexing operations and a Program Counter 28 which controls the selection of sequential items in the program. The outputs of the Address Register and the Program Counter are fed through an OR circuit 30 to Memory for specifying the address of a word to be selected therefrom. Interposed between the Accumulator and the A Register is an Adder circuit 32 which enables the performance of binary addition, subtraction, multiplication and division. The Adder circuit is described in greater detail in copending application Serial No. 414,459 now Patent No. 2,994,478 entitled, Electronic Digital Computer, filed in the name of Bernard L. Sarahan et al. on March 3, 1954 to which reference may be had for additional information if desired. After the Compare instruction is decoded, the word stored in the Accumulator is complemented and if a B Register mask is to be utilized, the contents of the B Register are placed in the A Register and are logically multiplied with the contents of the Accumulator by transferring binary ZEROS from the A Register mask. This is an AND operation after which each stage of the Accumulator contains the binary value ONE only if that stage previously contained a ONE and the corresponding order of the B Register mask also contained a ONE. In other words, in this operation, the existence of a ZERO in a stage of the A Register causes the corresponding stage of the Accumulator to be set to ZERO. The A Register is then complemented and the word to be compared which has been selected from Memory in accordance with the address portion of the Compare instruction and stored in the Memory Buffer Register is logically added to the contents of the A Register. This is an OR operation after which each stage of the A Register contains the binary value ONE if the stage (after the complementing of the B Register mask) contained a ONE or if the corresponding order of the word in the Memory Buffer Register contained a ONE. In effect, this operation involves the transfer of the binary ONES in the word stored in the Memory Buffer Register to the A Register. Thus if no B Register mask is utilized the logical addition effectively transfers the word from the Memory Buffer Register to the initially cleared A Register and if the B Register mask is utilized, those stages which already contain ONES in the A Register are unaffected as no ZEROS are transferred. The A Register thus either contains the word in normal form from the Memory Buffer Register; or contains ONES in those bit locations at which the mask has been applied and the proper binary values in the other bit locations. After the words have had time to settle in the A Register and the Accumulator a comparison is made in the static mode through use of AND and OR circuitry in the Adder, that circuitry being adapted to produce a signal to the Program Counter if a comparison is not made. Due to the fact that the data word in the Accumulator is in complement form there should be no agreement between corresponding stages of the Accumulator and the A Register if the words in fact compare and when there is the same binary value in corresponding bit locations an AND circuit will produce an output signal indicative of the lack of comparison.

Figure 2:
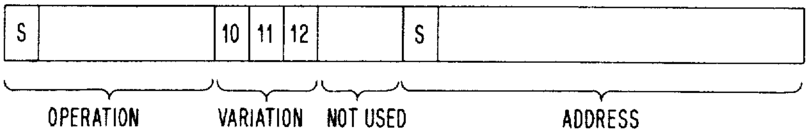
FIG. 2 is a diagram indicating the composition of the instruction word which controls the computer and comparison circuitries during the performance of the comparison operation in accordance with principles of the invention.

In this computer which is designed for parallel operation each instruction word includes a plurality of bits (binary digits), a group of these bits being known as the operation part of the instruction word and a second group being known as the address part of the instruction word. The layout of the Compare instruction word used in the preferred embodiment is shown in FIG. 2. The operation part or left half word (bits LS–L15) identifies some particular operation, such as add, multiply, subtract, divide, compare, etc., which the computer is to perform. The address part or right half word (bits RS–R15) in some instruction words identifies the address of the data word (operand) in memory on which the specified operation is to be performed, while, in certain other instruction words, for example the Branch instructions, the address part of the word identifies the address in Memory of the next instruction. This computer is designed to operate with a single address rather than multiple addresses associated with each instruction. In high-speed digital computers of the stored program type, a plurality of instruction words are stored in specified Memory Registers and the operands upon which these instructions are to be performed are stored in another group of Memory Registers. A plurality of instruction words arranged in sequence is called a Program. When an instruction word in a stored program has its address portion modified by some given amount the operation is known as Indexing. In the Compare instruction word bits LS–L9 specify the compare operation, bits L10–L12 specify certain variations of that operation, bits L13–L15 are unused, and bits RS–R15 specify the Memory Address location of one of the data words to be compared.

Briefly stated, in the preferred embodiment of this invention, in response to a First instruction (Load Accumulator) the data word with which a comparison is sought is placed in the Accumulator Register 16. This instruction is unnecessary if the desired word already exists in the Accumulator as a result of a previous computation. The next instruction of the program is the Compare instruction and according to the variation specified by bits L10–L12 this instruction enables the comparison of the entire word, specified by the instruction, a selected portion of the word or certain nonadjacent bit locations as desired. The latter two variations utilize masking information previously stored in the B Register 18. The word specified by the instruction is brought from Memory 10 and stored in the A Register 14 for comparison with the word stored in the Accumulator 16. This Compare instruction also permits the performance of a subtract operation during the same instruction cycle and if this has been specified by bit L12 of the instruction word the contents of the Accumulator 16 and A Register 14 are added through utilization of the Adder circuitry in the conventional manner after the static comparison has been made. The number stored in the Accumulator 16 is thus effectively subtracted from the number stored in the A Register 14, an opposite subtraction from that normally employed in the apparatus described in Patent No. 2,914,248.

The Program Counter 28 in the ordinary comparison sequence is normally stepped a single time if there is a comparison (to the next desired Program instruction after the comparison has been made) and in the event of no comparison it is stepped an additional time to a Branch instruction which enables an immediate return to another Compare operation where table look-up operations are being performed, for example. With this Compare instruction the contents of the Accumulator can be pre- ıerved for repetitive comparisons or for determining dif-'erences. This comparison apparatus makes use of the ıvailable Adder circuitry without modification other than he outputs of the available AND circuits being tied to-;ether through OR circuits for control of the Program Counter. If the subtraction process is to be employed hat operation occurs after the performance of the static omparison. It will be noted that the masking is accom-plished by forcing the unwanted bits (those not utilized in he comparison) to agree and then comparing all the bits.

Additional details of the invention will be understood s the description of the preferred embodiment progresses n conjunction with FIGS. 2–5. As indicated above, 'IG. 2 shows the composition of the Compare instruc-on word utilized in the preferred embodiment. The left alf of the word, bits LS–L15 are the operation portion nd bits LS–L9 are utilized to specify the Compare in-truction. Bits L10–L12 specify the variations that may e employed with the Compare instruction. If bits L10 nd L11 are both ZERO the B Register mask is to be mployed on a full word basis; if bit L10 is ZERO and .11 is ONE the right half of the word stored in the ıccumulator is to be compared with the right half of the 'ord stored in the A Register, if bit L10 is ONE and bit .11 is ZERO, the left halves of the words are to be com-ared, and if both bits L10 and L11 are ONE the entire ords are to be compared; and finally, if bit L12 is ZERO static comparison only is performed and if bit L12 is )NE a subtraction operation is also performed. The ght half of the word, bits RS–R15 specify the address f the word which is to be selected from Memory 10 and laced in the A Register 14 for comparison with the word reviously stored in the Accumulator 16.

FIG. 3 is a timing diagram of the instruction cycle indi-ıting the occurrence of the various gated timing pulses hich initiate operations that are to be performed during ese portions of the instruction cycle. The duration of e Compare instruction cycle is 12 microseconds, as indi-ıted by the horizontal line and timing pulses occur at 5 microsecond intervals. As indicated above a data ord is stored in the Accumulator in accordance with a evious instruction and a mask word is stored in the B egister if a B Register mask is to be employed. At PT7 e instruction word is read from Memory 10 through emory Buffer Register 12 and Operation Register 22 'er lines 34, 36, and 38 for decoding in the Instruction ontrol element 24. At PT9 the Command is generated complement the Accumulator and clear the A Register. the B Register mask technique is to be employed the ntents of the B Register 18 are transferred to the A egister at OT4 over lines 40. At OT5 the contents of A Register and the Accumulator are logically multi-ied and at OT6 the A Register is complemented. In her event at OT6 the word specified by the address por-n of the Compare instruction word which was trans-tted to the Address Register 20 over lines 42 is brought the Memory Buffer Register from the Memory. At T7 the contents of the Memory Buffer Register are logi-lly added to the contents of the A Register over lines and at OT9 a test for comparison (static) is performed rough use of the Adder circuitry and a pulse is gen-ıted on line 46 to step the Program Counter 28 if there a lack of proper comparison. If a subtract operation s been specified the gated timing pulse at OT10 initiates adding operation whereby the contents of the A Reg-er are added to the contents of the Accumulator in a quential operation which ends at PT6 with the difference ing placed in the combined Accumulator-B Register er line 48. At PT6, if no subtraction was called for, Accumulator is complemented in anticipation of a xt comparison operation and the Compare instruction cle thus terminates.

Figure 4:
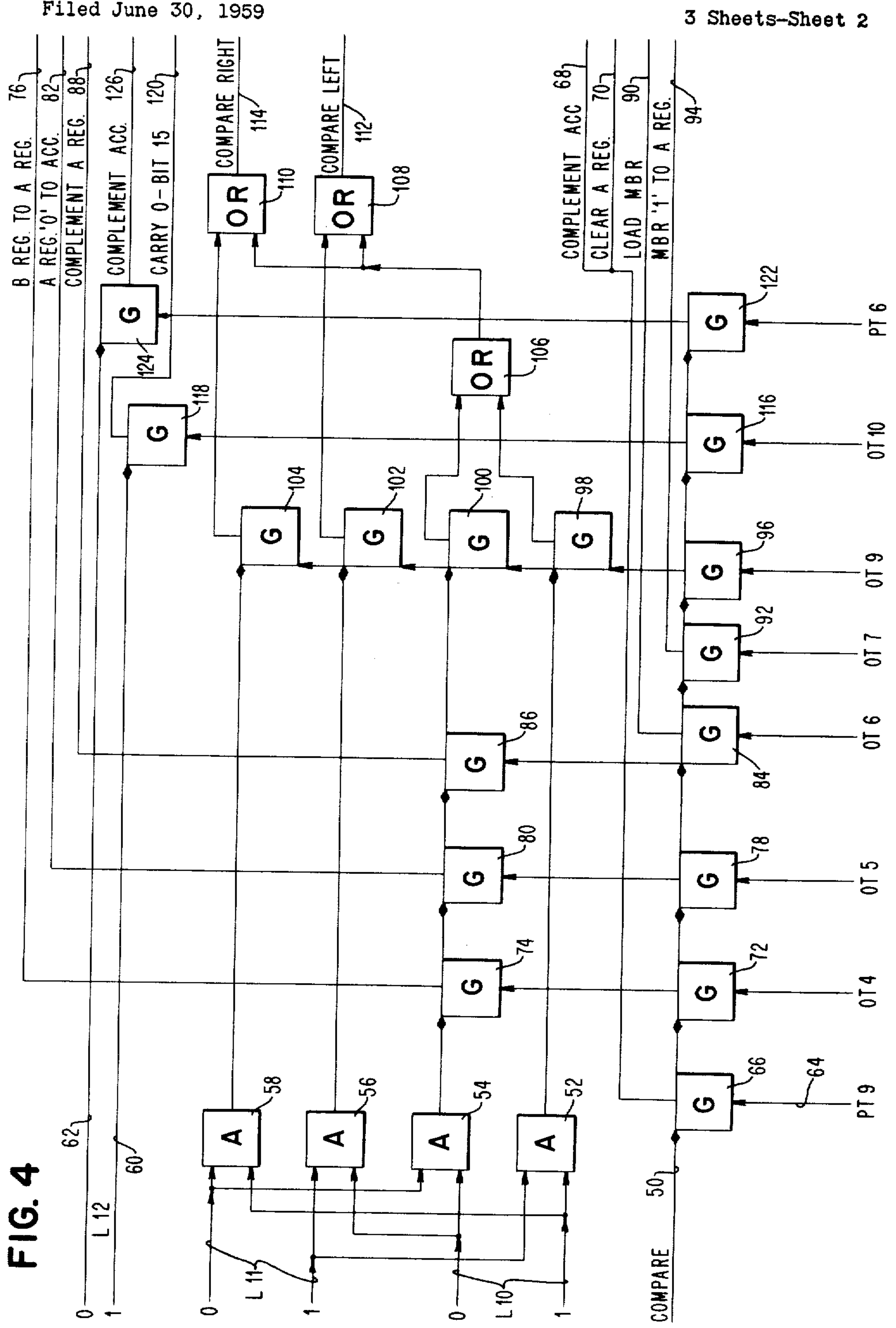
FIG. 4 is a logical diagram of the portion of the Instruction Control showing the command generator circuitry associated with the Compare Instruction according to principles of the invention.

The specific portions of the circuitry of the Instruction ntrol utilized to generate the requisite Commands for performing the Compare instruction are shown in simpli-fied diagram on FIG. 4. It will be understood that the actual embodiment is much more complex but it is be-lieved that a clear understanding of the preferred embodi-ment of the invention may be obtained from this descrip-tion, with future reference to Patent No. 2,914,248 if desired. That logical diagram indicates the coordination between the bits of the operation part of the instruction words and the timing pulses. The bits LS–L9 which specify the instruction are decoded by a suitable decoding network and supply a signal level on line 50, the binary values of bits L10 through L12 are also applied to the In-struction Control, bits L10 and L11 being applied to a decoding network consisting of AND circuits 52, 54, 56, and 58 and the binary values of bit L12 being directly connected into the Command generating network over lines 60 and 62. Each decoded signal provides a level which conditions one or more Gate circuits. These Gate circuits are sampled by timing pulses and if a Gate is conditioned a signal is passed thereby as a Command which initiates the desired operation.

All the timing pulses which are employed during the Compare instruction are gated by the Compare level on line 50. Thus at PT9 the time pulse on line 64 is passed by Gate 66 and develops a Command on lines 68 and 70. At OT4 a pulse is passed by Gate 72 and if the B mask technique is to be utilized (bit L10=0 and bit L11=0) Gate 74 is conditioned and a Command is developed on line 76. Similarly at OT5 a pulse is passed by Gates 78 and 80 to develop a Command on line 82 and at OT6 a pulse is passed by Gates 84 and 86 to develop a Command on line 88. The OT6 pulse is also passed by Gate 84 and develops a Command on line 90. It will be noted that no Commands will be generated by timing pulses at OT4 and OT5 unless a B mask is to be utilized. At OT7 Gate 92 is sampled and a Command is generated on line 94. The OT9 pulse samples Gate 96 and is passed to sample Gates 98, 100, 102, and 104. These Gates are conditioned by the outputs from the decoder network as-sociated with bits L10 and L11. Thus if AND circuit 52 is conditioned (ONE,ONE) Gate 98 will be condi-tioned and a pulse passed through OR circuits 106, 108, and 110 to generate Commands on lines 112 and 114; if AND circuit 54 is conditioned (ZERO,ZERO) Gate 100 is conditioned and a pulse is passed through OR cir-cuits 106, 108, and 110 to generate Commands on lines 112 and 114; if AND circuit 56 is conditioned (ZERO, ONE) Gate 102 is conditioned and a pulse is passed through OR circuit 108 to generate a Command on line 112; and if AND circuit 58 is conditioned (ONE,ZERO) the Gate 104 is conditioned and the OT9 pulse is passed therethrough and through OR circuit 110 to generate a pulse on line 114. At OT10 time a pulse is passed through Gates 116 and 118 if the value of bit L12 is ONE to generate a Command on line 120 which initiates the addition process. At PT6 a pulse is passed through Gate 122 and through Gate 124 which is conditioned when the value of bit L12 is ZERO to generate a Com-mand on line 126. The Compare instruction cycle then ends.

Figure 5:
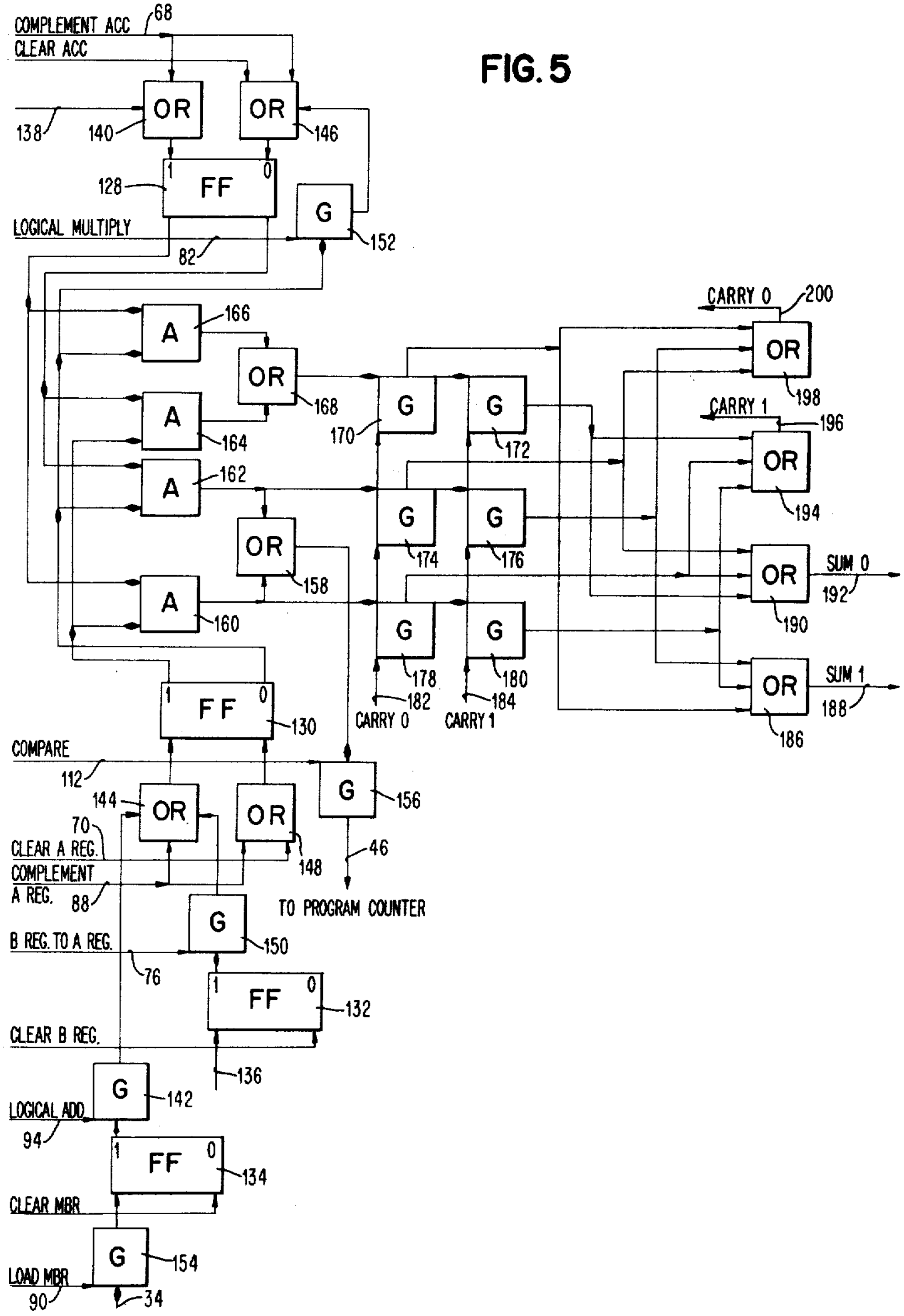
FIG. 5 is a logical diagram of a single corresponding stage of several computer elements utilized in the practice of the invention.

The application of these Commands to a single stage of the B Register, Accumulator, Adder, A Register and Memory Buffer Register circuitries is shown in FIG. 5. As each stage of these registers is essentially similar and adequate understanding of the operation of this circuitry can be obtained from the description of a single stage thereof. It will be understood that in the preferred em-bodiment these circuitries are divided into left and right sections and that each section is adapted to store sixteen bits.

If further information relative to the operation of these computer circuitries is desired reference may be had to Patent No. 2,914,243 and additional details relative to the operation of the Adder circuitry may be obtained from reference to Patent No. 2,994,478.

Each of the registers is shown as a flip-flop device, thus flip-flop 128 represents one stage of the Accumulator Register 16, flip-flop 130 represents one stage of the A Register 14, flip-flop 132 represents one stage of the B Register 18, and flip-flop 134 represents one stage of the Memory Buffer Register 12.

Signals are transferred to the B Register over line 136. The normal transfer path, as indicated in FIG. 1 to the B Register 18 is from the Memory Buffer Register 12 through the A Register 14 and the Accumulator 16 to the B Register. As a detailed showing of this signal transfer path does not contribute to an understanding of the invention a simplified showing has been utilized in FIG. 5. Similarly signals are transferred to the Accumulator over line 138 and through OR circuit 140. In the preferred embodiment the signal transfer path is from the Memory Buffer Register 12 through the A Register 14 to the Accumulator 16 but a simplified showing is also utilized here. The data transfer path from the Memory Buffer Register to the A Register is shown in FIG. 5 from the Memory Buffer Register flip-flop 134 through the Gate circuit 142 and OR circuit 144 to flip-flop 130.

The operation of this apparatus in response to a Compare instruction is as follows: If a B Register mask is to be utilized the word selected for masking purposes is first loaded into the B Register flip-flop 132 by an appropriate instruction. Then the word to be compared is loaded into the Accumulator flip-flop 128 by a second instruction. The Compare instruction is then generated and decoded. At PT9 time a Command is generated and applied over line 68 through OR circuits 140 and 146 to complement the Accumulator flip-flop 128 and over line 70 to clear the A Register flip-flop 130 through OR circuit 148. The word to be compared is now held in the Accumulator in complement form. If a B Register mask is to be utilized at OT4 time a Command pulse is generated on line 76 which samples the Gate 150 and transfers the word stored in the B Register through the OR circuit 144 to the A Register. At OT5 time a Command pulse is generated on line 82 which performs a logical multiplication of the word in the A Register (the B Register mask) with the word stored in the Accumulator by sampling the Gate 152 for passing a pulse through OR circuit 146 to flip-flop 128, thereby setting the stages of the Accumulator which correspond to those stages of the A Register that contain binary ZEROS to ZERO without carry. Thus the bit locations in the Accumulator 16 which are to be compared, as specified by ONES in the B Register mask, are not affected and all the other bit locations in the Accumulator are set to ZERO.

At OT6 time the Command to complement the A Register is generated and a signal on line 88 is passed through OR circuits 144 and 148 to complement the mask presently stored in the A Register. In other words all the bit locations which are not to be compared are now indicated by ONES in the A Register. At the same time the line 90 is pulsed to sample Gate 154 and transfer the data word to be compared to the Memory Buffer Register flip-flop 134.

At OT7 time a Command is generated on line 94 to bring the word that was transferred from Memory to the Memory Buffer Register at OT6 to the A Register in a logical addition operation which involves transferring the binary ONES of that word to the A Register without carries. The Gate 142 is sampled and if conditioned by a ONE level from the Memory Buffer Register flip-flop 134 it passes a pulse through OR circuit 144 to set flip-flop 130 to the ONE state. As a result of this operation ONES are placed in those flip-flops that correspond to the ONES in the word to be compared. If a B Register mask is utilized, there are already ONES in those stages that are not to be compared. If no mask is to be employed the A Register flip-flop 130 would have been in cleared condition and the exact word would have been transferred from the Memory Buffer Register 12 to the A Register 14 by the logical addition operation.

One microsecond later, at OT9, sufficient time has elapsed for the transferred word to settle in the A Register 14 and a static comparison is made by sampling the Gate 156 through generation of a pulse on line 112. This Gate is conditioned by an OR circuit 158 which in turn is conditioned by either AND circuit 160 or 162. One of the two AND circuits is conditioned if the associated stages of the Accumulator and A Register agree (contain the same binary value). As the word contained in the Accumulator is in complement form and the word in the A Register is in normal form, if the words in fact compare there should be no agreement between the A Register 14 and the Accumulator 16. The masking applied to the Accumulator and then in complement form to the A Register has forced those specified bit locations to disagree and hence they would produce no output. If there is an output from Gate 156 the signal is passed on line 46 to the Program Counter 23 to step that device an additional time, which, in a typical sequentially arranged table look-up operation would be to a Branch instruction for returning the program to another Compare operation. If there is a successful comparison on the other hand the Program Counter then specifies a Branch instruction to the desired instruction that is to be performed as a result of the successful compare.

At OT10 a Command is generated if a subtraction is to be performed. That Command pulse is applied to the carry ZERO line of the bit 15 stage of the Adder 32 to initiate an addition operation. In general, the sum developed by this Adder stage is placed in the sign bit flip-flop of the B Register and the proper carry information is delivered to the next Adder stage. This process ripples through all sixteen Adder stages. The possibility of overflow and/or end carry is handled by the provision of circuits associated with the sign bit Adder stage. The overflow circuit detects the presence of a sum equal to a greater than unity as the computer is designed to handle only negative numbers. The end carry corrects the sum after a shift left to compensate for the inherent shift right has been performed, and at the end of the addition a conditional end shift is generated for the purpose of realigning the number in the Accumulator properly. Additional details of the operation of the Adder circuitry may be had with reference to Patent No. 2,994,478.

With more particular reference to FIG. 5, one stage of the Adder includes four AND circuits 160, 162, 164, and 166, the outputs of which indicate the four possible combinations of bits in the associated stage of the Accumulator 16 and the A Register 14. The ONE-ZERO and ZERO-ONE combinations are applied through OR circuit 168 to Gate circuits 170 and 172. The ZERO-ZERO combination is applied to Gate circuits 174 and 176 and the ONE-ONE combination is applied to Gate circuits 178 and 180. The Gate circuits 170, 174, and 178 are sampled by a carry ZERO pulse on line 182 from the previous Adder stage and the Gate circuits 172, 176, and 180 are sampled by a carry ONE pulse from that stage on line 184. Thus one of the six gates will pass a pulse. The resultant partial sum is passed through an OR circuit 186 on line 188 if a ONE and through OR circuit 190 on line 192 if ZERO to the next lower stage of the combined Accumulator and B Register. A carry ONE signal is passed through OR circuit 194 and over line 196 to the next Adder stage or a carry ZERO signal is passed through OR circuit 198 and over line 200 to the next stage.

The add process terminates itself automatically with the difference between the number stored in the Accumulator as subtracted from the number originally stored in the A Register being stored in the Accumulator. It is to be noted that this subtraction process and its results of the reverse of which occurs when the Subtract instrucion described in Patent No. 2,994,478 is used. If no ›ubtraction was specified by the Compare instruction the ›ulse occurring at PT6 time generates a Command over ine 68 to complement the Accumulator and thus restores he Accumulator contents for a subsequent Compare in- truction.

The apparatus disclosed enables the rapid perform- nce of table look-up and other searching operations ›hether they be stored in a sequential table or in a andom table. The instruction permits the comparing ›f full words, portion of words or random nonadjacent ›its with appropriate subsequent control of the computer ›peration. Additionally, a dynamic comparison may be ›erformed and the results of that operation utilized to ontrol further operation of the computer. This appa- atus provides a flexible tool for computer programming nd enables the performance of table look-up and other earch operations at twice the speed possible in prior art nachines. While a preferred embodiment of the inven- on has been shown and described it will be understood hat the invention is not intended to be limited thereto r to details thereof and departures may be made there- rom within the spirit and scope of the invention as efined in the claims.

We claim:

1. A digital computer adapted to process binary coded ata in accordance with a sequential program of instruc- ons,
each instruction including a first group of bits identifying the instruction and a second group of bits identifying a single memory address,
comprising a memory for storing binary coded information,
first and second registers adapted to hold binary coded data words,
means for placing one data word in said first register in complement form,
means responsive to a compare instruction for placing the data word stored at the memory address specified by the instruction in said second register,
means optionally responsive to said compare instruction for selectively masking selected, corresponding orders of said data words stored in said first and second registers so that the values in said corresponding orders compare properly irrespective of the binary values in those orders of said data words, said last named means including
means responsive to said compare instruction to force the values in selected locations of said first register to assume a first binary value and to force the values in corresponding locations in said second register to assume a second binary value,
means responsive to said compare instruction for effecting a static comparison of the two data words in said registers and producing a significant signal indicating the results of said comparison
and means responsive to said significant signal to control the subsequent instruction sequence.

2. The digital computer as claimed in claim 1 and rther including a binary adder circuit to add the values the binary numbers stored in said registers, and com- on means coupling said binary adder circuit and said atic comparison means to said registers, said adder cir- iit being adapted optionally to effect a dynamic com- irison of said data words in response to said compare struction.

3. Selective comparison apparatus for a digital com- iter for comparing a selected plurality of data items in ie binary coded data word with a second plurality of ta items correspondingly located in a second binary ded data word comprising means to complement one said data words, means to force the values in selected cations in said first data word to have the binary value ie and the values in the corresponding locations in said cond data word to have the binary value zero, and means to simultaneously compare the data values in all the corresponding data locations in said two words, and to produce a significant signal when the data values in all the corresponding data locations are different.

4. Selective comparison apparatus for a digital computer for comparing selected orders of first and second binary coded data words comprising a first register having a plurality of orders, a second register having a corresponding plurality of orders, means to store binary coded information signals in said first and second registers, means to provide information for specifying the orders of said registers that are to be compared, means to logically multiply said order specifying information and the complement of said first data word and to store the result of said logical multiplication in said first register, means to logically add the complement of said order specifying information and said second data word and to store the result thereof in said second register, means for simultaneously comparing the contents of all the orders of said first and second registers and means to provide a significant indication of the result of the said comparison.

5. The apparatus as claimed in claim 4 and further including means for optionally subtracting one of said words from the other and common means coupling said subtracting means and said comparing means to said first and second registers.

6. Data processing apparatus operable in a sequence of instruction cycles, said apparatus being adapted to manipulate binary coded data in accordance with a program of binary coded instructions, comprising data word storage means for storing first and second data words, each having corresponding data orders, a binary adder circuit coupled to said storage means adapted to add data words stored therein, a storage register having a stage corresponding to each order of said data word, means to store order specifying information in said storage register to specify data orders for comparison purposes, means optionally operative in response to a compare instruction to modify said data words in accordance with the information in said storage register to enable an effective comparison between only the data orders specified by the information stored in said storage register, comprising first comparison means for logically multiplying said data order specifying information and the complement of one data word and storing the result thereof in said storage means, and means for logically adding a second data word and the complement of said data order specifying information, and storing the result thereof in said storage means, means for performing a static comparison of the data values of said specified orders in the first and second data words in response to said compare instruction and producing a significant signal when all the data values of said specified orders are different, and second comparison means optionally operative in response to said compare instruction to actuate said binary adder circuit to subtract said second result stored in said storage means from said first result.

7. Selective comparison apparatus for a digital computer comprising
first and second data storage registers, comparison logic being directly coupled to said first and second registers, said comparison logic adapted to produce a significant output signal when the data values in all the orders of said first register are different from the data values in all corresponding orders of said second register,
means to place a first data word in said first register in complement form,
means to simultaneously force all the data values in selected orders of the word in said first register to assume a first binary value,
means to place a second data word in said second register,
means to simultaneously force all the data values in orders corresponding to said selected orders of the word in said second register to assume a second binary value, and means to actuate said comparison logic to compare the data values in all the orders of said first and second registers simultaneously.

8. Selective comparison apparatus for a digital computer comprising first and second data storage registers, comparison logic, a binary adder, common means coupling said binary adder and said comparison logic to said first and second data storage registers, means to provide a comparison control word, means to place a first data word in said first register in complement form, means to transfer a first binary value to each order of said first data word corresponding to the data orders of said comparison control word that contain said first binary value in a logical multiplication operation, means to place said comparison control word in said second data register in complement form, and means operative subsequently to the placing of said comparison control word in complement form in said second register to transfer a second binary value different from said first binary value to each order of said second register corresponding to the data orders of a second data word that contain said second binary value in a logical addition operation, means to actuate said comparison logic to compare the data values in all the orders of said first and second registers simultaneously, said comparison logic, in response to said actuating means, producing a significant output signal if the data values in all the orders of said first register are different from the data values in all corresponding orders of said second register, and means to actuate said binary adder to add the contents of said first and second registers to effect a subtraction of said first data word from said second data word.

9. Selective comparison apparatus for comparing selected orders of first and second binary coded data words comprising means for modifying two data words to force data values in locations specified by a masking word to disagree, said modifying means including means to combine corresponding orders of the masking word and said first data word in a logical addition operation to provide a first modified word, and means to combine corresponding orders of the complement of the masking word and the complement of said second data word in a logical multiplication operation to provide a second modified word, and means for comparing all the values in said two modified words to determine whether the values in said modified words not specified by said masking word are all different.

References Cited in the file of this patent

UNITED STATES PATENTS

| | | |
|---|---|---|
| 2,914,248 | Ross et al. | Nov. 24, 1959 |
| 2,947,976 | Mendelson et al. | Aug. 2, 1960 |

FOREIGN PATENTS

| | | |
|---|---|---|
| 749,836 | Great Britain | June 6, 1956 |

OTHER REFERENCES

Univac II Data Automation System (publication), copyright 1957, Remington Rand Univac.